US008235815B1

(12) United States Patent
Kavars et al.

(10) Patent No.: US 8,235,815 B1
(45) Date of Patent: Aug. 7, 2012

(54) CAPTURE AND UTILIZATION OF REAL-WORLD DATA FOR USE IN GAMING SYSTEMS SUCH AS VIDEO GAMES

(75) Inventors: Christopher Lee Kavars, Elkader, IA (US); Leslie Davis, Elkader, IA (US)

(73) Assignee: Reference LLC, Elkader, IA (US)

( * ) Notice: Subject to any disclaimer, the term of this patent is extended or adjusted under 35 U.S.C. 154(b) by 0 days.

(21) Appl. No.: 13/303,646

(22) Filed: Nov. 23, 2011

Related U.S. Application Data

(63) Continuation of application No. 11/107,515, filed on Apr. 15, 2005, now Pat. No. 8,083,589.

(51) Int. Cl.
*A63F 9/24* (2006.01)

(52) U.S. Cl. .......... 463/36; 73/491; 73/489; 73/490

(58) Field of Classification Search .......... 463/36; 73/491, 489, 490; 273/317.1
See application file for complete search history.

(56) References Cited

U.S. PATENT DOCUMENTS

| | | |
|---|---|---|
| 4,716,458 A | 12/1987 | Heitzman et al. |
| 4,855,822 A | 8/1989 | Narendra et al. |
| 4,908,767 A | 3/1990 | Scholl et al. |
| 5,269,187 A | 12/1993 | Hanson |
| 5,456,604 A | 10/1995 | Olmsted et al. |
| 5,490,784 A | 2/1996 | Carmein |
| 5,499,182 A | 3/1996 | Ousborne |
| 5,541,860 A | 7/1996 | Takei et al. |
| 5,550,742 A | 8/1996 | Furuya et al. |
| 5,865,624 A | 2/1999 | Hayashigawa |
| 5,870,687 A | 2/1999 | Majstorovic |
| 5,917,730 A | 6/1999 | Rittie et al. |
| 5,919,045 A | 7/1999 | Tagge et al. |
| 5,947,868 A | 9/1999 | Dugan |
| 5,982,389 A | 11/1999 | Guenter et al. |
| 6,024,675 A | 2/2000 | Kashiwaguchi |
| 6,080,063 A | 6/2000 | Khosla |
| 6,152,856 A * | 11/2000 | Studor et al. ............ 482/8 |
| 6,205,374 B1 | 3/2001 | Kljima et al. |
| 6,241,657 B1 | 6/2001 | Chen et al. |
| 6,289,299 B1 | 9/2001 | Daniel, Jr. et al. |
| 6,295,464 B1 | 9/2001 | Metaxas |
| 6,322,455 B1 | 11/2001 | Howey |
| 6,336,891 B1 | 1/2002 | Fedrigon et al. |

(Continued)

FOREIGN PATENT DOCUMENTS

JP 2003-295482 8/2003

*Primary Examiner* — Dmitry Suhol
*Assistant Examiner* — Malina K Rustemeyer
(74) *Attorney, Agent, or Firm* — Craig A. Fieschko, Esq.; DeWitt Ross & Stevens S.C.

(57) ABSTRACT

A portable sensor unit for capturing motion and/or other data may be securely mounted on objects such as a user's limb, a vehicle, or other items. The sensor unit may then collect motion and/or other data from the object to which it is affixed, and may provide this data to a data logger which stores the data. The data logger may subsequently communicate the data to a gaming system which may tailor the motion characteristics of a virtual object to resemble those of the real-world object from which the motion data was captured. Thus, a user can (for example) capture motion data from a vehicle, with this data being supplied to a video gaming unit which provides a virtual vehicle having the same acceleration/deceleration, handling, and other characteristics.

25 Claims, 3 Drawing Sheets

U.S. PATENT DOCUMENTS

| | | | |
|---|---|---|---|
| 6,389,340 B1 * | 5/2002 | Rayner | 701/32.4 |
| 6,405,112 B1 | 6/2002 | Rayner | |
| 6,425,515 B2 | 7/2002 | Mays et al. | |
| 6,431,872 B1 | 8/2002 | Shiraishi et al. | |
| 6,522,332 B1 | 2/2003 | Lanciault et al. | |
| 6,535,215 B1 | 3/2003 | DeWitt et al. | |
| 6,545,682 B1 | 4/2003 | Ventrella et al. | |
| 6,571,193 B1 | 5/2003 | Unuma et al. | |
| 6,587,068 B2 | 7/2003 | Kuhn et al. | |
| 6,612,925 B1 * | 9/2003 | Forsberg | 463/6 |
| 6,616,529 B1 | 9/2003 | Qian et al. | |
| 6,634,949 B1 | 10/2003 | Briggs et al. | |
| 6,640,202 B1 | 10/2003 | Dietz et al. | |
| 6,658,347 B2 | 12/2003 | Shimotani et al. | |
| 6,674,391 B2 | 1/2004 | Ruszkowski, Jr. | |
| 6,726,567 B1 | 4/2004 | Khosla | |
| 6,902,513 B1 * | 6/2005 | McClure | 482/8 |
| 2001/0003715 A1 * | 6/2001 | Jutzi et al. | 463/40 |
| 2003/0000976 A1 * | 1/2003 | Malhotra | 224/197 |
| 2003/0232649 A1 * | 12/2003 | Gizis et al. | 463/40 |
| 2004/0224740 A1 * | 11/2004 | Ball et al. | 463/6 |
| 2005/0017454 A1 * | 1/2005 | Endo et al. | 273/317.1 |
| 2005/0177335 A1 * | 8/2005 | Crisco et al. | 702/141 |
| 2006/0217598 A1 * | 9/2006 | Miyajima et al. | 600/300 |
| 2007/0232455 A1 | 10/2007 | Hanoun | |

* cited by examiner

CAPTURE AND UTILIZATION OF REAL-WORLD DATA FOR USE IN GAMING SYSTEMS SUCH AS VIDEO GAMES

CROSS-REFERENCE TO RELATED APPLICATIONS

This application is a continuation of U.S. patent application Ser. No. 11/107,515 filed Apr. 15, 2005, now U.S. Pat. No. 8,083,589 the entirety of which is incorporated by reference herein.

FIELD OF THE INVENTION

This document concerns an invention relating generally to gaming systems (e.g., video game units and personal computer games), and more specifically to devices and methods for adapting gaming systems to better simulate the real-world attributes of a computer game user's abilities or belongings (e.g., his/her vehicle, sporting goods such as a bat or golf club, etc.).

BACKGROUND OF THE INVENTION

Video gaming systems, including computer gaming systems, are provided in a variety of forms, such as in video game consoles, e.g., the PLAYSTATION console of Sony Computer Entertainment Inc. (Foster City, Calif.), the XBOX console of Microsoft Corporation (Redmond, Wash.), the GAMECUBE of Nintendo of America, Inc. (Redmond, Wash.), etc.; in personal gaming consoles, e.g., the Sony PLAYSTATION PORTABLE handheld unit, the Nintendo GAME BOY handheld unit, etc.; in personal computer systems, including laptop computers, hand-held computers, and "personal digital assistants" (PDAs); and in various wireless communication devices (e.g., communications-enabled PDAs and cellular telephones). Most of these gaming systems rely on software programs wherein virtual characters (or other objects) are controlled by the game user(s), with the virtual objects being displayed with motion which generally approximates that in the real world. The game software contains algorithms, sometimes referred to as "physics engines," which define the laws of motion in the virtual environment of the game. Usually, these physics engines tend to follow Newtonian laws of conservation of motion, momentum, etc. so that real-world motion is simulated (though in some cases they may modify the physics of the virtual environment to allow special features such as flight, totally elastic collisions, etc.).

In many games, the virtual objects controlled by the user have fixed attributes which permanently define the objects' motion and other behavior. Alternatively, a game may offer a predetermined number of attribute sets from which the user can choose, thereby allowing the user some degree of customization of the virtual object's attributes. An example of such an arrangement is the Sony GRAN TURISMO game, which provides a simulated auto racing experience. Users are allowed to choose from dozens of different (virtual) cars whose acceleration, braking, cornering, and other driving/motion characteristics are intended to mimic those of corresponding real-world cars. The ability to choose virtual cars whose attributes mimic those of real-world cars is extremely popular because the user can better relate to the virtual objects on screen, and the game offers the user an opportunity to simulate use of a real-world car without risk.

The demand for customization of gaming systems is growing, with many gaming systems now allowing downloads from the internet (or other sources) whereby users may choose motion characteristics and other attributes as they wish. While users often wish to customize their games to match their own personal characteristics (or those of their vehicles or other possessions), this is usually very difficult. Initially, a user's options are often "prepackaged": the user is simply given a discrete number of predefined characteristics to choose from, and the user selects the one which (at least seemingly) best matches his/her real-world traits. Unfortunately, an exact match is usually unavailable. Further, while there are some games which provide a continuum of characteristics from which a user may choose—for example, the user might be able to set speed, strength, stamina, etc. values within some range between 0-100—a user often has no idea which values might accurately simulate real-world conditions. Thus, it would be useful to have available some system for customizing gaming systems so that the virtual objects therein are able to more accurately mimic the motion characteristics and other attributes of their real-world counterparts.

SUMMARY OF THE INVENTION

The invention involves a data capture and utilization system for gaming and simulation which is intended to at least partially solve the aforementioned problems. To give the reader a basic understanding of some of the advantageous features of the invention, following is a brief summary of preferred versions of the system. As this is merely a summary, it should be understood that more details regarding the preferred versions may be found in the Detailed Description set forth elsewhere in this document. The claims set forth at the end of this document then define the various versions of the invention in which exclusive rights are secured.

A preferred version of the data capture and utilization system is illustrated in a simplified schematic form in FIG. 1, and it includes a portable sensor unit 100 for attachment to a user or object (and thereafter sensing its motion), a data logger 130 which receives motion data from the sensor unit 100, and a gaming unit (such as a personal computer 150A or game console 150B, which will be collectively referred to as gaming unit 150) which can then receive the data from the data logger 130 and incorporate the sensed motion data into game play. Thus, the overall system is intended to allow the capture of motion data (including one or more of position, velocity, and/or acceleration) from a user, vehicle, or other object, and then provide the motion data to the gaming unit 150 so that virtual objects in a video/computer game—e.g., people, vehicles, sporting goods (such as balls, bats, racquets, and the like), etc. —can be given motion characteristics within the game which better resemble the motion of real-world objects familiar to the user. For example, the sensor unit 100 can capture the acceleration and braking characteristics of a user's car, and these characteristics can then be provided to the gaming unit 150 so that a virtual vehicle in a racing game can accurately simulate these characteristics.

The sensor unit 100 includes an accelerometer 102 capable of detecting motion in at least one dimension. Most preferably, a 3-axis accelerometer, i.e., an accelerometer which detects motion in 3 orthogonal directions, is used. The detected motion can be processed to yield position, velocity, and/or acceleration data, which represent significant aspects of the motion characteristics of the sensor unit 100. If desired, the sensor unit 100 can additionally include gyroscopes 104, global positioning system (GPS) units 106, or other devices, either onboard the sensor unit 100 or as optional peripheral devices. A gyroscope 104, for example, is useful for capturing angular position/velocity/acceleration information (e.g., yaw/pitch/roll information), which can further characterize the motion of the sensor unit 100. A GPS unit 106 is useful to capture "coarse" position data to supplement any position data integrated from the output of the accelerometer 102. The sensor unit 100 can also include data ports and/or other connectors for communication with other data sources. As an example, the sensor unit 100 might communicate with the OBDII, CAN Bus, or other system diagnostics ports of an automobile, thereby also allowing collection of data relating to matters such as torque output, fuel consumption, etc. In FIG. 1, a connection to an automotive systems diagnostic port 120 is provided from the data logger 130 to which the sensor unit 100 is connected, but other arrangements are possible, as will be discussed below.

The sensor unit 100 preferably provides the accelerometer 102 on a mount body 110 which is sized and configured to be hand-held or smaller (and thus portable), with a size of no greater than 8 inches at most in any dimension. The mount body 110 then preferably has multiple mounting legs 112 extending from its circumference, with mounting means (such as the straps 108) being borne on the legs 112 so that the mount body 110 can be easily affixed upon or about an object (such as a user's arm or leg). Alternatively, the mount body of the sensor unit 100 could be mounted on a user's clothing, on/about an item of sporting equipment (e.g., a bat, golf club, etc.), on a vehicle (e.g., to the dash of a car or the handlebars of a bicycle), or on any other moving item which might be represented in a video game. As shown in FIG. 2 and as will be discussed later, the mounting means could also or alternatively take the form of a pouch or the like which might bear straps, clips, fasteners or fastener apertures, etc., and which might receive a sensor unit (illustrated at 200 in FIG. 2) therein or thereon.

The data logger 130 is then connected in communication with the accelerometer 102 of the sensor unit 100, and stores data supplied therefrom. One preferred form for the data logger 130 is a Personal Digital Assistant (PDA), "pocket PC," or other device which is removably connected to the sensor unit 100, and which includes a display screen 132, input means 134 for inputting data and/or instructions (e.g., a keyboard, touchscreen/touchpad, or other common finger or voice-actuated input devices), and an internal processor (not shown) which provides output on the display screen 132 in response to data and/or instructions input to the input means 134. In this arrangement, the sensor unit 100 can be a primarily passive device which simply captures data and provides it to the data logger 130, which may store the data (with or without formatting or other processing) and later download it to the gaming unit 150. Alternatively, the data logger 130 could be integrated into the sensor unit 100 itself, and may include a rewritable memory which may be permanently fixed on the sensor unit 100, e.g., as an EEPROM or the like, or which may be removable, e.g., in a memory card or the like. In either event, the sensor unit 100 and/or data logger 130 might incorporate some data processing functions before providing the data to the gaming unit 150, such as calculating performance curves, charts, coefficients, or other condensed representations of the data. It should also be understood that the data logger 130 need not be physically connected in communication with the sensor unit 100 (e.g., by a cable 136, connecting port 138, telephone line, or the like), and it could be wirelessly connected, as by radio frequency or infrared communication. The same is true of communications between the data logger 130 and the gaming unit 150.

After the gaming unit 150 receives the captured data from the data logger 130, it may use the data to provide a game wherein virtual objects—generally virtual/computerized representations of the object(s) to which the sensor unit 100 was affixed—are displayed in motion. The motion characteristics of the virtual objects within the game can then be altered to depend on or conform to the data received from the data logger 130, and thus to the motion of the real-world object from which the data was captured by use of the sensor unit 100.

Further advantages, features, and objects of the invention will be apparent from the following detailed description of the invention in conjunction with the associated drawings.

DETAILED DESCRIPTION OF PREFERRED
VERSIONS OF THE INVENTION

Figure 1:
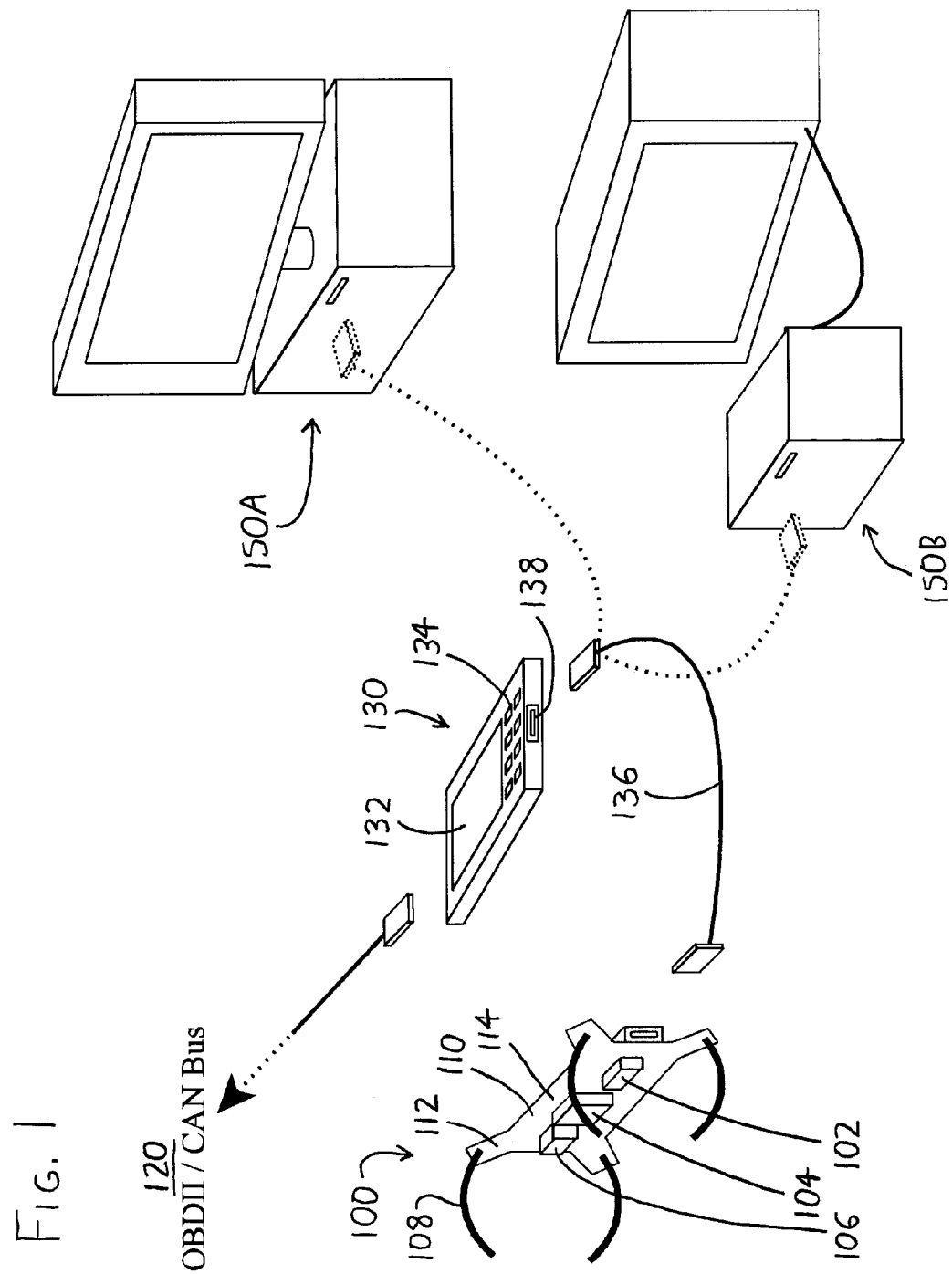
FIG. 1 is a simplified perspective view of a system for capturing and utilizing real-world data for use in a gaming system (such as personal computer 150A and/or game console 150B) by use of a sensor unit 100 attachable via straps 108 upon a user's limb (or about a portion of a vehicle, a sporting good, etc.), with data from an accelerometer 102 on the sensor unit 100 being stored in a data logger 130 (here taking the form of a handheld computer/PDA) for later supply to the gaming unit 150.

To elaborate on the description given in the foregoing Summary section of this document, FIG. 1 illustrates an exemplary simplified version of the invention wherein the sensor unit 100 collects motion data by use of one or more sensors, here an accelerometer 102, a gyroscope 104, and a GPS unit 106. The sensor unit 100 may be attached to an object via mounting means (such as straps 108), may be activated, and may then collect data reflecting the motion of the attached object. The captured motion data is supplied to and stored in a data logger 130, which subsequently supplies the motion data to a gaming unit 150. The gaming unit 150 then utilizes the motion data to define the motion characteristics of virtual objects in a game so that the virtual objects better simulate the behavior of the real-world objects from which the motion data was captured.

It is particularly beneficial that the sensor unit 100 be configured for rapid, easy and firm mounting to a wide variety of different objects, and FIG. 1 depicts the sensor unit 100 as having a generally flat/planar configuration with an irregular circumference from which mounting legs 112 extend. The mounting means (straps 108) preferably extend from the mounting legs 112 to allow easy attachment of the sensor unit 100 about (for example) a limb, an article of sporting goods (e.g., a baseball bat), a portion of a vehicle (e.g., a car armrest), etc. It should be understood that the straps 108 are shown in greatly simplified form in FIG. 1, and they need not take the form of simple tie cords, but could instead be loops, hooks, or other structures for wholly or partially encircling an object, and could bear buckles, snaps, hoop-and-loop fasteners, or other means for releasably fastening the straps 108. Further, as will be discussed below, the mounting means can take a wide variety of other forms, e.g., fasteners (such as snaps or other male/female connectors extending from the mounting legs 112, or fasteners such as bolts extending through the mounting legs 112), adhesive pads (including adhesive tape, hook and loop fastener, magnets, suction cups, etc.), pockets/pouches or other receptacles for receiving all or a portion of the sensor unit 100, and so forth.

Also, for ease of attachment, portability, and minimal encumbrance, it is preferable that the sensor unit 100 be small and lightweight. Particularly preferred versions for attachment about a user's limb of the like measure approximately 2 inches wide by 4 inches long by 1 inch high, but much of this area is unused space on the mount body 110, which could be made much smaller. In any event, it is preferred that the sensor unit 100 not exceed 8 inches in any dimension, since such a size begins to pose difficulties for portability, versatile usage, and ease of attachment.

The sensors included on the sensor unit 100 can vary, but for most gaming applications, it is believed that an accelerometer 102 can allow capture of most data of interest (which is primarily motion data). A 3-axis accelerometer, which measures acceleration in three orthogonal directions, is particularly preferred. Accelerometer data can be integrated to obtain velocity and position data, and vector calculations can allow quantification of translational motion (acceleration, velocity, position) in any direction on or off of the axes. Motion data in further degrees of freedom can be obtained by including the gyroscope 104, and most preferably a 3-axis gyroscope, whereby angular acceleration/velocity/position can be measured. The GPS unit 106, which is optional, is also useful for measuring bulk or "coarse" distance/position data, particularly since distance/position data generated solely by integrating accelerometer data can accumulate error over time. Thus, more accurate distance/position readings can be developed (particularly over larger distances) by utilizing the data from the GPS unit 106, either alone or in combination with distance data integrated from the accelerometer 102. Other useful sensors are tensionometers, which (when mounted on a limb or another part of the body) can help to measure strength and endurance; shock sensors, which can help measure punching/kicking strength and speed, as well as reflex actions; and pressure sensors, which can measure muscle activity when mounted on or in close proximity to a muscle (as by strapping the sensor unit 100 about the user's arm or leg with a pressure sensor resting atop a muscle group).

It should be understood that the gyroscope 104, GPS unit 106, and/or other sensors need not be provided onboard the sensor unit 100 (as depicted in FIG. 1), and these could instead be provided as separate item which plug into appropriate ports in the sensor unit 100 when their use is desired. Alternatively, they could be provided as separate items which communicate directly with the data logger 130, in which case the sensor unit 100 might bear some type of attachment means, either on its lower surface 114 or its upper surface (not shown in FIG. 1), for attaching the additional sensors to the sensor unit 100 and allowing them to be carried on the sensor unit 100 with the accelerometer 102. In this manner, all data measurements can still be taken from approximately the same location (if desired) when the sensor unit 100 is attached to the object of interest from which measurements are to be taken. In this respect, it is notable that the system need not collect data from one location/object at a time, and it could possibly use multiple sensor units 100 at different locations, and/or could use one or more sensor units 100 in combination with other data sources. As an example, if the data logger 130 has multiple data communication channels, it might collect data from a sensor unit 100 mounted on a user's limb, and could simultaneously collect data from some other sensor at another location (e.g., from a resistance meter attached to a bicycle on which the user is riding). In this respect, where data is to be collected from an automobile or similar motor vehicle, it is particularly useful to receive and store data from an automotive system diagnostic port 120, e.g., an Onboard Diagnostics II (OBDII) or Controller Area Network (CAN) bus port. Such ports 120 can provide data directly from automotive sensors, and thus provide data related to parameters such as vehicle speed, motor rpm, coolant/oil temperatures, torque/horsepower, brake activity, steering angle input, stability management information, gear selection, tire pressure, ambient temperature/pressure, and even vehicle identification data (such as the vehicle identification number). In the version of the invention depicted in FIG. 1, the data from the automotive systems diagnostic port 120 is connected directly to the data logger 130, and thus the data logger 130 collects and stores data from the diagnostics port 120 as well as from the sensor unit 100. However, similarly to the alternatives discussed above, the sensor unit 100 could itself include a cable or other connection to the automotive systems diagnostics port 120.

It is also possible to have at least some of the data used by the gaming unit collected solely by the data logger 130, assuming the data logger 130 has the capability to independently collect data inputs. As an example, if the data logger 130 is a personal computer or PDA, it could provide a questionnaire asking the user to (for example) rank the difficulty of some task that was just prompted/requested by the data logger 130, or rank fatigue, hunger, etc. As another example, the data logger 130 could collect data relating to matters such as mental acuity and/or intelligence, as by presenting a quiz to the user, either by itself or during some type of physical activity regimen from which the sensor unit 100 will collect data.

The data logger 130 may take the form of any device which is capable of storing data, and particularly preferred forms of data loggers 130 are handheld personal computers and PDAs, which tend to include features such as display screens 132 for illustrating input prompts and output to users, input means 134 (e.g., keyboards/touch screens), and USB (Universal Serial Bus) or other types of standard connection ports 138 for receiving and/or sending data (though data communication might additionally or alternatively occur wirelessly). The benefit of such data loggers 130 is that they are readily available and relatively inexpensive, and applications for collecting and labeling data can be readily created for and downloaded onto such data loggers 130. In suitable environments, the data logger can simply be a laptop computer (useful, for example, on an unoccupied car seat where the sensor unit 100 is being used to collect vehicle performance data), or a standard personal computer (useful, for example, where performance data is being collected from a user who is exercising indoors, e.g., on a treadmill, weightlifting bench, exercise mat, etc.).

While the data logger 130 could take the form of little more than a device which continuously or periodically writes the sampled data to a memory without any processing beforehand, it is useful if the data logger 130 has some degree of programmability. Programmability allows for more "intelligent" data collection, for example, allowing data collection to start and/or stop upon some predetermined event, allowing different data to be collected at desired times, etc. To illustrate, when taking endurance measurements, the data logger 130 could be programmed to detect a 0.2G acceleration detected at the sensor unit 100 as a triggering event, and could then measure the time during which a substantially constant velocity is maintained.

Additionally, since many sensors provide data outputs which do not directly reflect real-world units of measurement (i.e., sensor outputs are often in counts or voltages which require interpretation in order to be converted into useful parameters/measurements), the data need not be stored in the data logger 130 or delivered to the gaming unit 150 in a "raw" or as-collected form. As an example, the data logger 130 may perform data formatting or other conversion prior to data storage (e.g., it might "condense" the data by creating representative data values, equations, or coefficients which statistically or otherwise represent the data). It is also or alternatively possible that the data logger 130 could simply store raw data obtained from the sensor unit 100, and the gaming unit 150 could then perform its own data conversion before using the data. However, it is preferred that the sensor unit 100 and/or data logger 130 organize and process the data prior to providing it to the gaming unit 150, so that the gaming unit 150 simply receives the lookup tables, equations, coefficients, or other values necessary to drive its physics engine to simulate the real-world object from which the data was collected.

In FIG. 1, data transmission between the sensor unit 100 and the data logger 130 is illustrated as occurring via a cable 136. However, it should be understood that data communication could also or alternatively occur by physical relocation of memory media between the sensor unit 100 and the data logger 130 (e.g., swapping a memory card between the sensor unit 100 and the data logger 130), by wireless communication, or by other modes of communication.

To illustrate an exemplary process for collection of data, following is a possible routine that might occur during data collection from a vehicle. Upon connection of the data logger 130 to the sensor unit 100 (which might be affixed to the vehicle's dashboard), the data logger 130 might display a prompt such as "Collecting data: 0-60 acceleration. Press start to begin." The user could then press the "Start" button displayed on the touch screen 132 (or could press an appropriate key on the keyboard 134), and could then press the accelerator pedal. Data collection might start once the "Start" button is depressed, or for greater accuracy, it might not begin until the sensor unit 100 detects that motion has begun. Once 60 mph is reached, the user could then press a "stop" button and data collection can cease (unless it ceased beforehand, e.g., upon detection of 60 mph speed by the sensor unit 100 and data logger 130. The data logger 130 might then display "Deceleration: 60-0 braking. Press start to begin." The user could then press "Start," execute the indicated action, and press "Stop" when finished. Another prompt might then be displayed, such as "Handling: execute right turn at approximate 5 mph speed. Press start to begin," and the user can again proceed to collect data. In this manner, the sensor unit 100 and data logger 130 establish a data set characterizing the motion characteristics of the vehicle: its acceleration, braking, handling, etc.

The data set can then be provided to the gaming system 150, and to a game which is configured to accommodate the data set and apply it to its "physics engine" (i.e., the rules/algorithms governing motion) so that the motion of virtual objects within the game will more accurately simulate those of the real-world objects. As an example, if the game in the gaming unit 150 relates to a racing game/simulation, the gaming unit 150 might allow the user to download some or all of the collected data from the data logger 130. Alternatively, the data logger 130 could do no more than simply display data values (or representative coefficients, etc.) on its display screen 132, and the user could then type in or otherwise enter these values into a gaming unit 150. The gaming unit 150 would then provide a car (or other vehicle) in the racing game with acceleration, braking, steering, etc. responses resembling those measured by the sensor unit 100 from the real-world vehicle.

Figure 2:
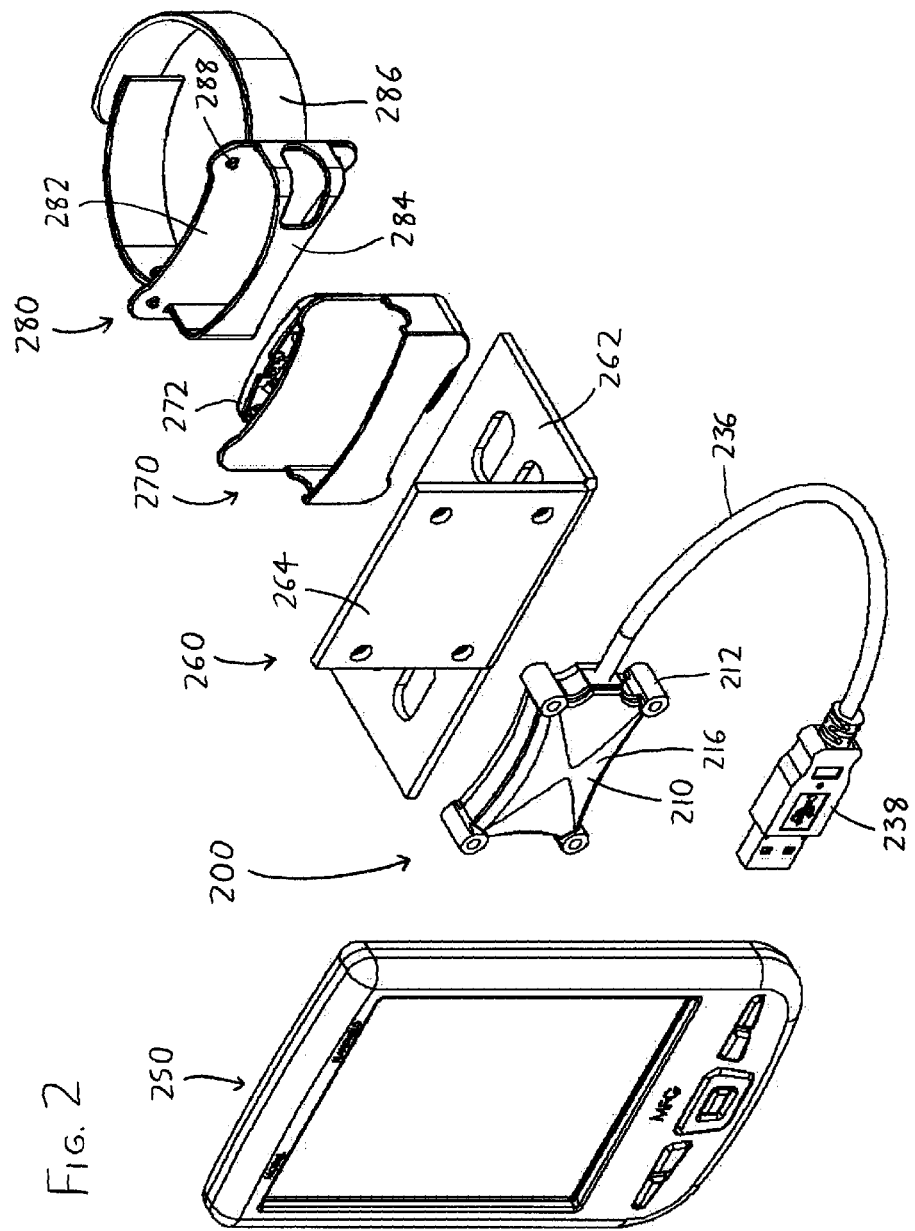
FIG. 2 is a perspective view of a prototypical sensor unit 200, a data logger 250, and various forms of mounting means for removably affixing the sensor unit 200 to the surface of an object, e.g., an attachment bracket 260 for affixing the sensor unit 200 to a dashboard or armrest of an automobile (or other structure), a pouch 270 for the sensor unit 200 which bears a clip 272 whereby the sensor unit 200 may be affixed to a user's clothing or other structure), and a wrap 280 whereupon the sensor unit 200 may be mounted against a plate 282 with a retaining band 284 partially encircling the sensor unit 200, with a strap 286 then being affixed about a user's limb (or another structure).

FIG. 2 then provides a view of a prototypical sensor unit 200, wherein the accelerometer and/or other sensors are situated within the casing or mount body 210 of the sensor unit 200. Several mounting legs 212 extend from the circumference of the mount body 210, with the mounting legs 212 here being defined as a series of tubular members which protrude from both the circumference of the mount body 210, and also from the planes of its outer surface 216 and inner surface (not shown). The sensor unit 200 can be directly affixed to an object, as by inserting fasteners through the mounting legs 212 and into an object; extending straps/attachment cords through or about the legs 212, and subsequently about the object; or by other mounting means. FIG. 2 illustrates several mounting means provided in the form of intermediate mounting structures, such as the attachment bracket 260. The attachment bracket 260 has a base 262 adapted to affix to other structure, e.g., to the "island" of a vehicle (the area between the front seats), and the legs 212 of the sensor unit 200 may be attached to an upwardly-extending flange 264 via fasteners and the like. The sensor unit 200 may communicate with the data logger 250 wirelessly or via its cable 236 (which terminates in a conventional USB connector 238, and which is not necessarily shown to scale in FIG. 2). The data logger 250 could rest at any convenient area adjacent the attachment bracket 260, e.g., on an adjacent vehicle seat so that a driver/user can follow prompts presented by the data logger 250, can initiate data collection, etc.

Alternatively, a user might fit the sensor unit 200 into the pouch 270, which bears a clip 272 for affixing the pouch 270 onto (for example) an article of clothing worn by the user. As an illustration, a user might affix the pouch 270 to a belt or waistband to which the data logger 250 might be separately clipped. The user could then run, ride a bicycle, or engage or in other activities from which data can be collected.

The wrap 280 is intended to allow the sensor unit 100 to fit about an object such as the user's limb, some portion of a vehicle, some article of sporting goods, etc. Here, the sensor unit 100 may be fit against the plate 282 with its mounting legs 212 aligned to receive the protruding pins 288, and with the retaining band 284 then firmly holding the sensor unit 200 onto the plate 282. The strap 286 can then be wrapped about the user's limb or another object, and may have its opposing ends affixed together by buckles, hook-and-loop fastener, or the like, and the sensor unit 200 may then collect data from the object as it moves. In this case, the cable 236 might extend to the user's waist, where the data logger 250 might be clipped.

It is notable that while mounting means (such as fasteners, straps, or other matter) could be provided on various different regions of the sensor unit 100, it has been found to be particularly useful to provide the mounting means on the protruding legs 212. Mounting means extending from the legs 212 provide a secure multipoint connection to an object, which is useful since single-point attachments (as from a mounting "stem"), and/or simple dual point attachments, are susceptible to spurious vibration of the sensor unit 100 in one or more planes. Additionally, the protruding legs 212 are also useful because they present an irregular profile which is easily fit into certain types of mounting means (such as the pouch 270 or the wrap 280), and which is firmly grasped by such mounting means even if the portion of the user or object to which the sensor unit 200 is mounted is undergoing extremely vigorous motion.

Figure 3:
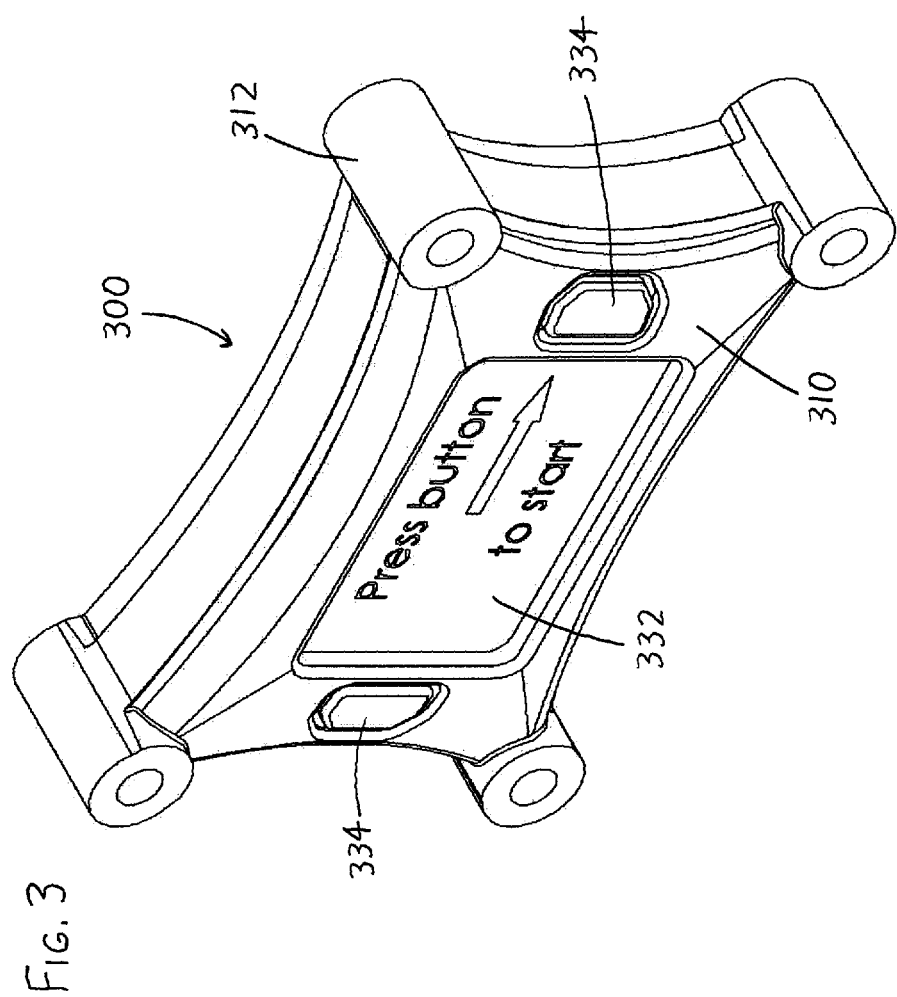
FIG. 3 is a perspective view of a modified version of the sensor unit 200 of FIG. 2, wherein the data logger is incorporated within the sensor unit 300, and collected data is later communicated to a gaming unit (not shown) wirelessly or via a data port (also not shown).

FIG. 3 illustrates a sensor unit 300 which is a variation of the sensor unit 200 of FIG. 2. The sensor unit 300 has generally the same configuration as the sensor unit 200, with a mount body 110 having generally the same size/shape (and generally the same mounting legs 312, etc.), but here the sensor unit 300 incorporates the data logger within its mount body 310. A display screen 332 and input means 334 (input/output buttons) are provided to allow the user to easily enable and disable data collection. A USB or other data communication port (not shown) may be included on the mount body 310 to allow communication of data to a gaming unit, or alternatively such communications could occur wirelessly or by physical transfer or memory media (e.g., by swapping a memory card).

Various exemplary versions of the invention have been shown and described to illustrate possible features of the invention, but modifications are also considered to be within the scope of the invention. In particular, as illustrated by the sensor unit 300 (with data logger incorporated therein), it is possible to combine and/or separate various components of the invention. As previously noted, the sensor unit and data logger can be combined, or the data logger and the gaming unit could be combined as well (e.g., where a personal computer is used as both the gaming unit and a data logger). It is also possible to incorporate all of the sensor unit, data logger, and gaming unit in a single device, for example, into a portable gaming unit. In this example, a user could mount the gaming unit to the user's body, a vehicle, or another object, and the gaming unit might provide prompts to the user to initiate data collection runs. Upon collecting the data, the gaming unit could then utilize collected data in subsequent game play. One disadvantage with this approach is that many portable gaming units are not constructed with the desired degree of durability for the sensor unit (which is preferably somewhat rugged). However, some cell phones/portable telecommunications devices are ruggedly constructed, and these devices may be good candidates for incorporation of a sensor unit, data logger, and gaming unit. Since such devices are often designed to be carried by or attached to users, such devices are also good candidates for incorporation of a sensor unit and data logger for collection of motion data from the user, to later be transmitted—perhaps via wireless internet—to a gaming unit. In this instance (as well as with the other versions of the sensor units discussed above), the data collected from the user's activities might have utility to medical personnel, physical therapists, and the like, apart from use in the gaming unit, because the sensor unit promotes a particularly convenient means for collecting and transmitting physiological data.

Similarly, it is notable that while the invention has benefits for recreational gaming, other uses—e.g., in educational training and simulation activities—can also be particularly valuable. The system allows a user to execute health, physical education, and science simulations which accurately resemble real-world conditions, but which would be too expensive or dangerous to actually run under real-world conditions. Regarding the physical education setting, video and computer games are often blamed for disinterest in physical activity, but if a user's gaming performance is linked to the user's actual physical abilities, the user has an incentive to develop physical fitness in order to enhance game play.

The invention is not intended to be limited to the preferred versions of the invention described above, but rather is intended to be limited only by the claims set out below. Thus, the invention encompasses all different versions that fall literally or equivalently within the scope of these claims.

What is claimed is:

1. A method for capturing and utilizing data from a moving real-world object for use in a game, the method including the following steps performed by a user:
    a. moving a real-world object with a portable sensor unit removably mounted thereon, the sensor unit including an accelerometer capable of detecting motion in at least one dimension and a display screen, wherein the sensor unit collects motion data over a data capture time period;
    b. responding to instructions regarding how the real-world object should be moved;
    c. at a later time after motion of the real-world object has ceased, supplying to a gaming unit a motion data set generated from the collected motion data;
    d. playing a game on the gaming unit wherein:
        (1) the game features a virtual game object in motion, and
        (2) wherein the motion of the virtual game object is dependent on:
            i. the motion data set, and
            ii. game play input received from the user by the gaming unit during the display of the moving virtual game object.

2. The method of claim 1 wherein:
    a. the user also responds to queries delivered by the sensor unit regarding characteristics of the user; and
    b. the motion of the virtual game object in the gaming unit is also dependent on user responses to the queries.

3. The method of claim 1 wherein the motion of the virtual game object is also dependent on user responses to queries regarding characteristics of the user, wherein the queries are received by the user during or near the time the user receives instructions regarding how the real-world object should be moved.

4. The method of claim 1 wherein the display screen is configured to deliver to the user both:
    a. the instructions regarding how the real-world object should be moved, and
    b. queries delivered by the sensor unit regarding characteristics of the user, wherein the motion of the virtual game object in the game is also dependent on user responses to the queries regarding characteristics of the user.

5. The method of claim 4 wherein the display screen is further configured to display the virtual game object in motion.

6. The method of claim 1 wherein:
    a. the display screen is configured to deliver the instructions, and
    b. wherein the sensor unit further includes a data logger configured to store the motion data from the accelerometer.

7. The method of claim 6 wherein:
    a. the gaming unit includes the sensor unit therein; and
    b. the display screen is further configured to deliver the images of the virtual game object in motion.

8. The method of claim 1 wherein the sensor unit is defined within a mobile telephone.

9. The method of claim 8 wherein the gaming unit is also defined within the mobile telephone.

10. The method of claim 1 further including the steps of:
 a. collecting motion data from two or more separate sensor units, each sensor unit including an accelerometer, while each sensor unit is in motion;
 b. supplying to the gaming unit a motion data set generated from the collected motion data of the separate sensor units.

11. The method of claim 1 wherein the motion of the virtual game object is also dependent on data collected from the system diagnostics port of an automobile.

12. The method of claim 1 wherein the real-world object is:
 a. the user's body, or
 b. a vehicle.

13. A method for capturing and utilizing data from a moving real-world object for use in a game, the method including the steps of:
 a. providing a sensor unit, the sensor unit including an accelerometer capable of detecting motion in at least one dimension and a display screen, wherein the sensor unit is removably mounted to a real-world object,
 b. while the sensor unit is mounted to the real-world object, delivering instructions to a user instructing the user to move the real-world object;
 c. storing data from the accelerometer during motion of the real-world object in accordance with the instructions;
 d. generating a motion data set from the stored data, wherein the motion data set characterizes the motion of the real-world object;
 e. at a later time after motion of the real-world object has ceased, displaying a virtual game object in motion on a gaming unit, with the motion of the virtual game object being dependent on:
  (1) the motion data set, and
  (2) game play input received by the gaming unit from a game player during the display of the moving virtual game object.

14. The method of claim 13:
 a. further including the step of delivering queries to the user regarding characteristics of the user; and
 b. wherein the motion of the virtual game object is also dependent on user responses to the queries.

15. The method of claim 14 wherein both the instructions delivered to the user and the queries delivered to the user are provided on the display screen.

16. The method of claim 14 wherein the queries are delivered to the user during or near the time that the real-world object is moved in accordance with the instructions, with the virtual game object being displayed in motion on a gaming unit at a later time thereafter.

17. The method of claim 13:
 a. wherein the display screen is configured to deliver the instructions to the user; and
 b. the sensor unit further includes a data logger configured to store the motion data from the accelerometer.

18. The method of claim 17 wherein:
 a. the sensor unit is provided within the gaming unit; and
 b. the display screen is further configured to deliver the images of the virtual game object in motion.

19. The method of claim 13 further including the steps of:
 a. providing two or more separate sensor units, each sensor unit including an accelerometer capable of detecting motion in at least one dimension;
 b. storing data from the accelerometer of each sensor unit during motion of the real-world object to which each sensor unit is mounted;
 c. generating the motion data set from the stored data of the sensor units.

20. The method of claim 13 wherein the real-world object is a portion of:
 a. the body of a user, or
 b. a vehicle.

21. A system for capturing and utilizing data from a moving real-world object for use in a game, the system including a sensor unit:
 a. including a display screen and an accelerometer capable of detecting motion in at least one dimension;
 b. configured to:
  (1) be removably mounted to a real-world object;
  (2) deliver one or more of:
   i. instructions regarding how the real-world object should be moved, and
   ii. queries regarding characteristics of the user;
  (3) collect motion data from the accelerometer over a data capture time period during motion of the real-world object;
  (4) supply to a game a motion data set generated from the collected motion data, wherein the game displays images of a virtual game object in motion, with the motion of the virtual game object being dependent on:
   i. the motion data set, and
   ii. game play input collected from a user during the display of the moving virtual game object.

22. The system of claim 21 wherein the display screen is configured to display one or more of:
 a. the instructions regarding how the real-world object should be moved; and
 b. the queries regarding characteristics of the user.

23. The system of claim 22 wherein the display screen is further configured to display the images of the virtual game object in motion.

24. The system of claim 22 wherein the sensor unit further includes a data logger configured to store the motion data from the accelerometer.

25. The system of claim 21 wherein the sensor unit is provided within a mobile telephone.

* * * * *